United States Patent [19]

Vestberg et al.

[11] Patent Number: 5,164,456
[45] Date of Patent: Nov. 17, 1992

[54] METHOD OF PREPARING A POLYOLEFIN-VINYL POLYMER-COMPOSITE

[75] Inventors: Torvald Vestberg, Porvoo; Ismo Lehtiniemi, Helsinki, both of Finland

[73] Assignee: Neste Oy, Finland

[21] Appl. No.: 584,359

[22] Filed: Sep. 18, 1990

[30] Foreign Application Priority Data

Sep. 20, 1989 [FI] Finland .................... 894461

[51] Int. Cl.⁵ .................. C08F 255/02; C08F 263/04; B32B 27/30; B32B 27/32
[52] U.S. Cl. .................................... 525/324; 525/260; 525/263; 525/285; 525/296; 525/302; 525/309; 525/317; 525/902; 428/522; 428/523
[58] Field of Search .............. 525/260, 263, 285, 296, 525/302, 309, 317, 324, 902

[56] References Cited

U.S. PATENT DOCUMENTS

| | | | |
|---|---|---|---|
| 3,737,483 | 6/1973 | Kosaka et al. | 525/302 |
| 3,848,025 | 11/1974 | Alberts et al. | 525/302 |
| 3,853,970 | 12/1974 | Dietrich | 525/302 |
| 4,202,845 | 5/1980 | Chang et al. | 525/302 |
| 4,262,052 | 4/1981 | Kannan et al. | 428/319.7 |
| 4,303,756 | 12/1981 | Kajimura et al. | 525/302 |
| 4,412,938 | 11/1983 | Kakizaki et al. | 525/85 |

OTHER PUBLICATIONS

"Hawley's Condensed Chemical Dictionary," Eleventh ed. New York, Van Nostrand Reinhold Co., 1987, p. 1014.

Primary Examiner—James J. Seidleck
Assistant Examiner—Vasu S. Jagannathan
Attorney, Agent, or Firm—Steinberg & Raskin

[57] ABSTRACT

Polyolefin-vinyl polymer composites are produced by impregnating polyolefin particles with vinyl monomer and free radical polymerization initiator in the ratio of about 10-200 parts by weight of vinyl monomer and 0.01-4.0 parts by weight free radical polymerization initiator per 100 parts by weight polyolefin, the impregnation being effected by slowly mixing the components at room temperature or at an elevated temperature below the decomposition temperature of the free radical polymerization initiator. After the impregnation is completed, an aqueous suspension of the mixture is formed by adding the same to water in a ratio of about 100 parts by weight of mixture per 80-1000 parts by weight of water, after which the aqueous suspension is heated to a temperature sufficiently high to polymerize the vinyl monomer.

16 Claims, No Drawings 5,164,456

METHOD OF PREPARING A POLYOLEFIN-VINYL POLYMER-COMPOSITE

BACKGROUND OF THE INVENTION

Polyolefin composites can be used as such and formed into different articles, such as foam plastic or components in semi-conductor layers on electric cables. Composites are known which consist of polyolefin and a vinyl polymer.

In attempts to improve the consistency, dimension stability, printability and other properties of polyolefins that are formed into different articles or foamed plastics, attempts have been made to mix the polyolefin with a vinyl polymer such as polystyrene. However, because of the low compatibility of the polystyrene in the polyolefins, it is extremely difficult to obtain homogeneous mixtures having an attractive appearance. Even small amounts of 0.2-10 percent by weight, result in a lower impact resistance and poor appearance for the mixture.

Attempts have been made to overcome these problems by polymerizing the styrenes inside the polyolefin particles. There are basically two different methods of polymerizing the styrenes in situ in the polyolefin particles and both of these methods are based on the diffusion of the styrene inside the polyolefin particles, after which the polymerization of the styrene is carried out in conventional manner. The major difference between the two methods is the manner in which the styrene is diffused inside the polyolefin particles.

West German patent DE 29 07 662 describes the polymerization of styrene in situ in several different polyolefins. In this method the styrene is added slowly to an aqueous suspension containing the polyolefin particles at an elevated temperature. The impregnation and polymerization of the styrene proceed simultaneously, resulting in the polymerization tending to happen mainly in the surface regions of the polyolefin particles, with the result that the polystyrene is enriched in the surface layer by the polyolefin particles.

U.S. Pat. No. 4,412,938 describes polymerization of styrene in situ in ethene-vinylacetate copolymers. In this method the entire amount of styrene is added at once to an aqueous suspension containing the ethene-vinylacetate copolymer particles. The addition of the styrene is carried out at such low temperature that no polymerization occurs. It is not until the styrene, or the major portion of the styrene, has diffused inside the ethene-vinylacetate copolymer particles that the temperature is increased and the polymerization begins. A disadvantage of this method is that it takes several hours before the styrene has diffused inside the ethene-vinylacetate copolymer particles so that the method is time consuming.

SUMMARY OF THE INVENTION

It is according a primary object of the present invention to provide an improved method of forming polyolefin-vinyl polymer composites wherein the vinyl monomer is polymerized inside the polyolefin particles.

It is another object of the present invention to provide a method of producing polyolefin-vinyl polymer composites which overcomes all of the above mentioned problems and disadvantages.

It is another object of the present invention to provide a method of producing polyolefin vinyl polymer composites which, while avoiding the problems and disadvantages of known methods, retains the good points of the known methods whereby a homogeneous mixture of the polyolefin vinyl polymer is produced and the polymerization product is obtained in the form of particles.

With the above and other objects in view, the present invention mainly comprises a method of producing polyolefin vinyl polymer composites wherein:

10-200 parts by weight of vinyl monomer and 0.01-4.0 parts by weight per each 100 parts by weight of vinyl monomer of a free radical polymerization initiator are impregnated into 100 parts by weight polyolefin particles by slowly mixing the same at room temperature (e.g., 20°-25° C.) or at an elevated temperature, after completion of the impregnation, a water suspension is prepared by adding 80-1000 parts by weight of water per each 100 parts by weight of polyolefin plus vinyl monomer to the mixture, which can also include a stabilizer, and the temperature of the aqueous suspension is increased to a temperature sufficient to polymerize the vinyl monomer.

After the 100 parts by weight of polyolefin particles have been mixed with 10-200 parts by weight of vinyl monomer and 0.01-4.0 parts by weight of a free radical initiator, the mixture is agitated slowly at such low temperature that no decomposition of the initiator and no polymerization occurs, while maintaining the temperature at a sufficiently high temperature such that the polyolefin particles are impregnated with the monomer. When the entire amount of monomer and initiator have diffused inside the polyolefin particles, in other words when the surface of the polyolefin articles is "dry", water and stabilizer are added. The temperature is then raised and the polymerization commences. When the polymerization has been completed, the polymerization product is washed and dried.

By this method of preparing the polyolefin-vinyl polymer composite, the absorption of the vinyl monomer occurs in the absence of water. As a consequence, the monomer is able to penetrate the polyolefin particles without having to diffuse through a water phase so that the impregnation of the monomer is faster than in the method described in U.S. Pat. No. 4,412,938. During the impregnation, the polyolefin particles swell somewhat depending on how much vinyl monomer has been added. However, the physical form of the polyolefin particles is retained.

Another aspect of this method is that the water is not added until the surface of the polyolefin particles is "dry", thus guaranteeing that the monomer has diffused completely into the polyolefin particles and as a consequence, a homogeneous polyolefin-vinyl polymer composite is obtained.

The following constitutes further details of the present invention:

The Polyolefin

Useful polyolefins include high density polyethene, low density polyethene and linear low density polyethene. The polyethene can be a homopolymer or a copolymer. The comonomer can be, for example, vinyl acetate, methyl acrylate, methyl methacrylate, ethyl acrylate and methacrylate, butyl acrylate, and methacrylate, vinylchloride, propene or some other α-olefin. Also ethene-α-olefin-polyene-terpolymers are useful. The α-olefin can be, for example, propene, butene, pentene, isofrene, hexene or mixtures thereof and the polyene can for example be hexadiene-1,4, hexadiene-1,5, heptadiene-1,6, 2-methylpentadiene-1,4, octadiene-1,7 octatriene, 6-methylheptadiene-1,5, dicyclopentadiene. In the case where the ethene polymer is a copolymer, the amount of ethene in the copolymer should be at least 50 percent by weight.

The polyolefin can also be polypropene and its copolymers. The propene copolymers should consist of more than 50 percent by weight of propene and the comonomer can be ethene or another $\alpha$-olefin or a polar unsaturated monomer.

Ethene-vinylacetate copolymers have shown to be especially suitable as polyolefins in the manufacture of polyolefin vinylpolymer composites. In this case the amount of vinylacetate in the copolymer should be 1-35 percent by weight.

The polyolefin should be in particle form with a particle size of 0.5-10 mm, most preferably 1-6 mm. When the polyolefin is in the form of particles it is easy to achieve a good agitation during the impregnation phase which results in the concentration of the vinylmonomer being the same in all of the polyolefin particles. Particles which are too large may give problems in keeping the suspension stable at the end of the polymerization. Too small particles may also give rise to stability problems.

The Vinylmonomer

Suitable vinylmonomers are the aromatic vinylmonomers of the type of styrene and substituted styrenes. The substituted styrenes may have the substituent on the benzene ring as in methylstyrene, isopropylstyrene and chlorostyrene, or on the $\alpha$-carbon atom as in $\alpha$-methylstyrene and $\alpha$-ethylstyrene. Suitable vinylmonomers include the above mentioned monomers or mixtures thereof. The comonomers of the above mentioned aromatic vinylmonomers can also be other vinylmonomers, for example vinylacetate, acrylonitrile, $C_1$-$C_7$ alkyl methacrylates, vinylhalides, methacrylonitrile, maleic acid anhydride, acrylamide and methacrylamide used in amounts not more than 50 percent by weight. Styrene has shown to be especially suitable for the preparation of polyolefin vinylpolymer composites.

The Amount of Vinyl Monomer

The amount of vinyl monomer that is polymerized in the polyolefin matrix is 10-200 parts by weight calculated on 100 parts by weight polyolefin. More than 200 parts by weight vinyl monomer may give problems in keeping the polyolefin in the form of particles during the impregnation; the particles tend to agglomerate and form a homogenous phase. It is not appropriate to add less than 10 parts of weight of vinyl monomer because such amounts of vinyl polymer give only small changes in the properties of the starting polyolefin.

The Initiator

The initiators that are suitable for the polymerization of vinyl monomers are the initiators that are conventionally used in connection with suspension polymerization. Initiators suitable to be used to polymerize the vinyl monomer include organic peroxides such as benzoyl peroxide, lauroyl peroxide, t-butyl perbenzoate, t-butyl peroxide-2-ethylhexanate, t-butyl peroxide, dicumyl peroxide, di-t-butyl peroxide, bis(t-butylperoxyisopropyl)benzene, t-butylperoxyisopropylcarbonate and azo-compounds, as for example azobisisobutyronitrile and azobisdimethylvaleronitrile.

Preferably more than one initiator is used simultaneously so that the polymerization is started with a low temperature initiator and is completed at high temperature with a high temperature initiator. The total amount of initiator can be between 0.01 and 4 parts by weight, most preferably between 0.1 and 1.2 parts by weight, calculated on 100 parts by weight vinyl monomer.

Impregnation of the Vinyl Monomer

In accordance with the present invention the impregnation of the vinyl monomer in the polyolefin particles is carried out in the absence of water but in such a way that the polyolefin is sustained in the form of particles. The impregnation is carried out so that polyolefin particles, styrene and initiators are added to a reactor in any order. If the initiator or the initiators are in powder form they are preferably dissolved in a part of the total amount of vinyl monomer to guarantee that the concentration of the initiator will be the same in the different polyolefin particles. For the same reason also liquid initiators can be mixed with the vinyl monomer before they are mixed with the polyolefin particles.

The temperature during the impregnation is 20°-100° C. dependent on the type of the polyolefin and the type of the vinyl monomer, in other words depending on how easily the vinyl monomer penetrates the polyolefin. The impregnation temperature should be so low that essentially no polymerization occurs during the impregnation phase. Thus, the impregnation temperature should be taken into consideration in the selection of initiator.

With the intention that the concentration of the vinyl monomer shall be the same in the different polyolefin particles, the reactor content should be mixed slowly during the impregnation. The agitation speed, expressed as the end speed of the mixer, should be 0.05-5.0 m/s, most preferably 0.1-1.0 m/s. In a 22 liter reactor this end speed corresponds to an agitation speed of about 10-100 rpm. Too high agitation speeds may cause decomposition of the polyolefin particles to powder form and at a too low agitation speed the vinyl monomer may be distributed unequally between the polyolefin particles.

The impregnation is complete when all of the vinyl monomer has been diffused inside the polyolefin particles. In practice this is the time when the surface of the polyolefin particles, after having been wet and blank of vinylmonomer monomer is changed and gets a "dry" appearance. This change is sharp and easy to observe.

Generally, the impregnation takes 0.2-2.0 hours depending on how easily the vinylmonomer penetrates inside the polyolefin particles and depending on whether the impregnation is carried out at an increased temperature or not. It is not necessary to carry out the impregnation in the same reactor as the polymerization.

Preparation of the Aqueous Suspension

When all of the vinyl monomer has penetrated inside the polyolefin particles, water and suspension agent is added and the agitation speed is increased to values usually used in connection with suspension polymerization, in other words to such values that a good agitation in the reactor can be sustained to keep the suspension stable.

Conventionally, suspending agents can be used in the suspension polymerization of vinyl monomers, including the following: water soluble polymers, such as polyvinyl alcohol, polyvinyl pyrrolidone and methyl cellulose or partially water soluble agents, such as calcium triphosphate and magnesium pyrophosphate.

The amount of water is not critical but the amount should be sufficient for the suspension to be maintained during the polymerization which means 80–1000 parts by weight water per 100 parts by weight polyolefin+-vinyl monomer.

If the impregnation has been carried out at an increased temperature, the water can preferably be preheated to the same temperature before it is mixed with the vinyl monomer swelled polyolefin particles. This is done to avoid the vinyl monomer, due to abrupt temperature decrease, diffusing out of the polyolefin particles which could occur in the case that the temperature of the added water is lower than the temperature of the polyolefin that is impregnated with vinyl monomer.

Polymerization of the Vinyl Monomer

The polymerization of the vinyl monomer that has been absorbed inside the polyolefin particles is carried out by increasing the temperature in the agitated reactor, whereat the initiator decomposes and initiates the polymerization. The polymerization can be carried out at one or several temperatures in the temperature range of 50°–140° C. Preferably, the polymerization is started at a low temperature such as 50°–90° and then finished at a high temperature such as 90°–140° C. Generally, the entire polymerization takes between 5 and 15 hours.

After the polymerization has gone to completion, the reactor is cooled and the product is then after treated in a normal way as in suspension polymerizations usually (for example wash and dry) and it is then ready for further treatment.

The polyolefin particles keep their particle form during the polymerizations. Compared with the original polyolefin particles the particles after the polymerizations are only slightly larger depending on the absorbed and polymerized vinyl monomer.

The Properties of the Polymerizations Product

The polymerization product gives a homogeneous and an esthetic impression. The vinyl monomer polymerized in the polyolefin particle is distributed on pearls of the size of 0.05–2.0 $\mu$m, which are homogeneously distributed in the polyolefin matrix. The concentration of the vinyl polymer is as high in the center regions as in the surface regions of the particle, confirmed by IR-microscopy.

As the vinyl monomer is polymerized inside the polyolefin particle, a part of the polymerized vinyl monomer will exist in homopolymer form and a part in the polyolefin, in a grafted form. Even if the proportion of the grafted vinyl polymer is considerably smaller than the proportion of homopolymer, its existence is important for the morphological stability of the composite, during working.

One aspect of this invention, is that the morphology of the composite is unchanged after working, in other words, the vinyl polymer is left in pearl form, with the size of 0.05–2.0 m, homogeneously distributed in the polyolefin matrix. The working of the composite is simple depending on a wide temperature range for working and on a suitable melting index at the working temperature.

Compared with unmodified polyolefins the composites made in accordance with this invention have improved mechanical properties, such as hardness, rigidity and in some cases strength.

The Use of the Composite

Mixed polymer composites made in accordance with this invention can be used in many different ways, dependent on the used polyolefin and vinyl monomer and their proportions.

Thus, it is for example possible to increase the mechanical strength of many polyolefins by polymerization in situ of a vinylmonomer inside the polyolefin. For example it is possible to increase hardness and rigidity of ethene vinylacetate copolymers and polypropenes by polymerization therein in situ of styrene. These composites can be used as such and formed into different articles. The composites can also be mixed with other thermoplastics, with the resulting composite having the above mentioned advantages.

Ethene vinylacetate copolymer-polystyrene composites can be impregnated with any conventional blowing agent, as for example iso-or n-pentane after which it can be expanded with steam to foamed plastic. Such a foamed plastic has better elasticity properties and better resistance against different chemicals than polystyrene foam.

Polypropene-polystyrene composite films made in accordance with this invention can be stretched in one or two different directions and thereafter they can be used as synthetic paper.

Composites of ethenevinylacetate-copolymer-polystyrenes can be components in electric cable semiconducting layers which then becomes easy to take off from the cable in coupling works.

DESCRIPTION OF THE PREFERRED EMBODIMENTS

The following examples are given to further illustrate the present invention. The scope of the invention is not, however, to be limited to the specific details of the examples:

EXAMPLE 1

70 parts by weight (22 g) ethenevinyl-acetate copolymer-particles were added to a two liter reactor with a diameter of 2–3 mm. The ethene vinyl-acetate-copolymer (EVA) was the commercial product EVACO B 5028 of Neste Oy and contained 28 percent by weight vinyl-acetate and its melting index was 5 g/10 min, measured according to the standard ISO 1133, 2.16 kg and 190° C.

30 parts by weight styrene were then added and the initiators were azobisiso-butyronitrile 0.4 percent by weight, benzoylperoxide 0.2 percent by weight and t-butyl peroxy benzoate 0.4 percent by weight. The percents by weight of the initiators are calculated on the basis of the amount of styrene. The mixture was slowly agitated, 30 rotations per minute, at room temperature, until all of the styrene and the initiator had diffused inside the EVA particles, which in this case took 45 minutes.

After the end of the impregnation the water suspension was made by adding 280 parts by weight water and 1.0 percent by weight tricalcium phosphate as stabilizer and 0.03 percent by weight sodium dodecylbenzene sulfonate. The percentages of the stabilizers are calculated on the basis of the total amount of styrene and EVA polymer. After this, the agitation speed was increased to achieve a good mixture in the reactor.

The polymerization was started by increasing the temperature to 55° C. and kept there for three hours.

After that the temperature was increased to 90° C. over 3.5 hours, including two pauses of one hour each, one at 65° C. and one at 75° C. After 1.5 hours at the temperature 90° C., the temperature was increased to 120° C. and was kept there three hours to complete the polymerization.

After cooling the reactor was emptied and the EVA-polystyrene composite particles with the size of 3-4 mm were washed and dried. The particles were white and homogeneous. With scanning electron microscope it was confirmed that the polystyrene had dispersed in the form of round pearls with the size of approximately 0.2–0.5 μm in the EVA matrix.

EXAMPLE 2

This experiment was carried out in the same way as Example 1, however, with the difference that the experiment was carried out in a 10 liter reactor and that the proportions of EVA and styrene was 50:50, or 833.6 g of both. The amount of water was 5.2 kg and the impregnation took 80 minutes.

EXAMPLE 3

This experiment was carried out in accordance with Example 1, with the difference that the experiment was carried out in a 22 liter reactor and that the proportions of EVA and styrene were 60:40 or 2250 g:1700 g. The amount of water was 12.35 kg and the impregnation took 60 minutes.

EXAMPLE 4

This experiment was carried out in the same way as Example 3, however with the different that the proportion of EVA and styrene were 85:15.

EXAMPLE 5

40 parts of weight (123 g) EVA polymer particles were added in a 2 liter reactor with a diameter of 2-3 mm. The EVA polymer was the commercial product EVACO B 2305-21 of Neste Oy and contained 5 percent by weight vinylacetate and its melting index was 2.3 g/10 min measured according to ISO 1133 2.16 kg and 190° C. After that 60 parts by weight styrene was added and 0.4 percent by weight benzoyl peroxide and 0.67 percent by weight t-butyl peroxy benzoate as initiator. The percents by weight of the initiators are calculated on the amount of styrene. The mixture was slowly agitated, 50 rotations per minute, and was heated to 70° C. to accelerate the impregnation of the styrene and the initiators inside the EVA particles. The impregnation took 2 hours.

After the end of the impregnation, the water suspension was made by adding 280 parts by weight water at a temperature of 70° C. and 1.0 percent by weight tricalcium phosphate as stabilizer and 0.03 percent by weight sodium dodecylbenzene sulfonate. The percents of the stabilizers are calculated on the total amount of EVA and styrene. The agitation speed was increased to achieve a good mixing in the reactor.

The polymerization was started by elevation of the temperature to 80° C. which was maintained for 2 hours. After that the temperature was elevated to 90° C. which was maintained for 3 hours. Finally, the polymerization was completed at 125° C. in 3 hours. The after treatment of the polymerization product was done in the same way as in Example 1 and it was found to have the same structure and appearance as in Example 1.

EXAMPLE 6

This example was carried out in accordance with Example 5 however with the difference that the proportion between EVA and styrene was 60:40 or 1000 g:667 g and the polymerization was carried out in a 10 liter reactor.

EXAMPLE 7

This example was carried out as Example 5 but with the difference that the proportions of EVA and styrene were 80:20 and the polymerization was carried out in a 22 liter reactor.

EXAMPLE 8

The polymerization products from the above described experiment were in all cases very homogeneous and the polystyrene was dispersed in the form of round pearls with a size of 0.2–0.5 μm in the ethene vinylacetate copolymer matrix.

The composite of ethene vinylacetate copolymer-polystyrene was melt-pressed at 150°–170° C. to discs of the thickness 1 mm and 3 mm which thereafter were used for mechanical tests. The results of the mechanical tests can be found in Table 1 and Table 2.

TABLE 1

The results from the mechanical tests of EVA-PS composites made on EVA containing 28 percent by weight vinylacetate.

| Ex No. | EVA perc. by weight | PS perc. by weight | Strength 1) MPa | Hardness 2) shore D/3s | Vicat 3) °C. | Bending-strength 4) MPa |
|---|---|---|---|---|---|---|
| Homo EVA | 100 | — | 22.4 | 25 | 35 | — |
| 4 | 85 | 15 | 25.0 | 26 | 39 | — |
| 1 | 70 | 30 | 19.1 | 36 | 50 | — |
| 3 | 60 | 40 | 19.3 | 41 | 57 | 100 |
| 2 | 50 | 50 | 13.2 | 50 | 66 | 290 |
| Homo PS | — | 100 | 34.5 | 79 | 88 | 3060 |

TABLE 2

The results from the mechanical tests of EVA-PS composites made on EVA containing 5 percent by weight vinylacetate.

| Ex No. | EVA perc. by weight | PS perc. by weight | Strength 1) MPa | Hardness 2) shore D/3s | Vicat 3) °C. | Bending-strength 4) MPa |
|---|---|---|---|---|---|---|
| Homo EVA | 100 | — | 17.5 | 41 | 85 | 130 |
| 7 | 80 | 20 | 15.2 | 50 | 87 | 200 |
| 6 | 60 | 40 | 12.6 | 53 | 91 | 400 |
| 5 | 40 | 60 | 23.4 | 64 | 101 | 1200 |

TABLE 2-continued

The results from the mechanical tests of EVA-PS composites made on EVA containing 5 percent by weight vinylacetate.

| Ex No. | EVA perc. by weight | PS perc. by weight | Strength 1) MPa | Hardness 2) shore D/3s | Vicat 3) °C. | Bending-strength 4) MPa |
|---|---|---|---|---|---|---|
| Homo PS | — | 100 | 34.5 | 79 | 88 | 3060 |

Explanations.
Homo EVA: Neste Oy's commercial ethene vinylacetate copolymer as reference
Homo PS: Neste Oy's commercial polystyrene PS-128 as reference
1) measured according to DIN 53504
2) measured according to DIN 53505
3) measured according to ISO R 306 A
4) measured according to ASTM 790m-86

While the invention has been illustrated with respect to the production of particular composites, it is apparent that variations and modifications of the invention can be made without departing from the spirit or scope thereof.

What is claimed is:

1. A method of producing polyolefin-vinyl polymer composites, which comprises mixing a vinyl monomer, a free radical polymerization initiator and polyolefin particles, in a ratio of 10-200 parts by weight vinyl monomer and 0.01-4.0 parts by weight free radical polymerization initiator per each 100 parts by weight polyolefin particles, at a temperature from room temperature up to below the temperature at which said free radical polymerization initiator decomposes, to impregnate said polyolefin particles by said vinyl monomer and said polymerization initiator, the impregnation of the vinyl monomer and the initiator being carried out in the absence of water at a temperature of 20°-100° C. while maintaining the particle structure of the polyolefin, suspending the thus formed mixture in water in an amount of 80-1000 parts by weight of water per each 100 parts by weight of said mixture, and increasing the temperature of the thus formed aqueous suspension to a temperature sufficiently high to cause polymerization of said vinyl monomer, whereby said vinyl monomer is polymerized within said polyolefin, thus forming a polyolefin-vinyl polymer composite.

2. Method according to claim 1, wherein said polyolefin is polyethene or an ethene copolymer containing more than 50 percent by weight of ethene and wherein the comonomer is vinyl acetate, α-olefine, acrylic acid, methacrylic acid, acrylic esters, methacrylic esters, polyene or vinyl chloride.

3. Method according to claim 1, wherein said polyolefin is polypropene or a propene copolymer containing more than 50 percent by weight propene and wherein the comonomer is ethene, olefin or a polar unsaturated monomer.

4. Method according to claim 1, wherein the diameter of the polyolefin particles is between 0.5-10 mm.

5. Method according to claim 1, wherein said vinyl monomer is an aromatic vinyl monomer.

6. Method according to claim 5, wherein said aromatic vinyl monomer is styrene or a substituted styrene.

7. Method according to claim 6, wherein said substituted styrene is methyl styrene or α-styrene.

8. Method according to claim 1, wherein said vinyl monomer is a mixture of up to 50 percent by weight of an aromatic vinyl monomer and a non-aromatic vinyl monomer.

9. Method according to claim 8, wherein said non aromatic vinyl monomer is vinyl acetate, acrylonitrile, methacrylonitrile, $C_1$-$C_7$ alkylacrylate or $C_1$-$C_7$ methacrylate, vinyl halides, maleic acid anhydrides, acrylamide or methacrylamide.

10. Method according to claim 1, wherein said initiator is an organic free radical polymerization initiator.

11. Method according to claim 10, wherein said organic free radical polymerization initiator is a peroxide or an azo compound.

12. Method according to claim 10, wherein said initiator is benzoyl peroxide, lauroyl peroxide, t-butyl peroxibenzoate, dicumyl peroxide or azobisisobutyronitrile.

13. Method according to claim 1, wherein the polymerization of the vinyl monomer is carried out at a temperature of about 50°-140° C.

14. Method according to claim 1, wherein the polymerized vinyl monomer is in the form of round pearls having the size of about 0.05-2.0 μm and vinyl monomer is polymerized inside said polyolefin particles.

15. Method according to claim 1, wherein the amount of initiator is about 0.1-1.2 parts by weight.

16. Method according to claim 1, wherein the polyolefin particles are agitated during mixing with the vinyl monomer and initiator.

* * * * *